United States Patent [19]
Dunn et al.

[11] Patent Number: 5,758,288
[45] Date of Patent: May 26, 1998

[54] SIGNAL TIME OF ARRIVAL POSITION DETERMINING METHOD FOR CALCULATING CELLULAR TELEPHONE BILLING CHARGES

[76] Inventors: Michael Jeffrey Dunn, 24607 SE. 46th St., Issaquah, Wash. 98027; Don Harold Atherly, 3217 Whitten Dr., Eugene, Oreg. 97405; Douglas Otto John Reudink, 13916 SE. 47th St., Bellevue, Wash. 98006; Martin Jay Feuerstein, 10930 Forbes Creek Dr. #S 106, Kirkland, Wash. 98033; Ronald Ernest Foerster, 618 Randolph Pl., Seattle, Wash. 98122; Ching Chuang, 19230 SE. 46th St., Issaquah, Wash. 98027; Dino John Vendetti, 9620 NE. 20th St., Bellevue, Wash. 98004-1827

[21] Appl. No.: 794,261

[22] Filed: Jan. 31, 1997

Related U.S. Application Data

[60] Division of Ser. No. 240,070, May 9, 1994, Pat. No. 5,600,706, which is a continuation-in-part of Ser. No. 178,954, Jan. 7, 1994, abandoned, which is a continuation-in-part of Ser. No. 865,090, Apr. 8, 1992, Pat. No. 5,295,180.

[51] Int. Cl.⁶ .......................... H04M 11/00; G01S 3/02
[52] U.S. Cl. .......................... 455/456; 455/406; 342/463
[58] Field of Search .................. 379/59, 58, 60; 342/357, 463, 450; 455/421, 422, 406, 407, 456, 440

[56] References Cited

U.S. PATENT DOCUMENTS

| | | |
|---|---|---|
| 5,155,490 | 10/1992 | Spradley, Jr. et al. ............ 342/357 |
| 5,225,842 | 7/1993 | Brown et al. ............ 342/357 |
| 5,235,633 | 8/1993 | Dennison et al. ............ 455/12.1 X |
| 5,365,516 | 11/1994 | Jandrell ............ 370/335 |
| 5,408,683 | 4/1995 | Ablay et al. ............ 455/456 X |
| 5,542,100 | 7/1996 | Hatakeyama ............ 455/456 X |
| 5,581,261 | 12/1996 | Hickman et al. ............ 342/385 |
| 5,600,706 | 2/1997 | Dunn et al. ............ 379/59 |
| 5,612,703 | 3/1997 | Mallinckrodt ............ 342/457 |
| 5,717,406 | 2/1998 | Sanderford et al. ............ 342/457 X |

*Primary Examiner*—David R. Hudspeth
*Assistant Examiner*—Scott Richardson
*Attorney, Agent, or Firm*—Brooks & Kushman, P.C.; Peter J. Kinsella

[57] ABSTRACT

A cellular telephone mobile unit position determining method which utilizes a plurality of range transceivers located at known fixed locations adapted to transmit approximately synchronized digital range signals. The method is especially adapted to determine the position of a cellular mobile unit within cellular service areas for determining billing charges and/or access restrictions. According to the invention, the fixed position range transceivers transmit range signals which are received by a mobile unit. The mobile unit determines either the time difference of arrival or absolute time of arrival of the range signals, which in turn is used to determine the mobile unit's position for cellular billing and/or access restriction purposes. The range transceivers are operable to receive an error signal and correspondingly adjust the output of the next transmitted range signal so as to drive the detected synchronization error to approximately zero.

16 Claims, 8 Drawing Sheets

SIGNAL TIME OF ARRIVAL POSITION DETERMINING METHOD FOR CALCULATING CELLULAR TELEPHONE BILLING CHARGES

CROSS-REFERENCE TO RELATED APPLICATIONS

This application is a division of application Ser. No. 08/240,070 filed May 9, 1994 now U.S. Pat. No. 5,600,706, which is a continuation-in-part of U.S. patent application Ser. No. 08/178,954 filed Jan. 7, 1994 abandoned, which is a continuation-in-part of U.S. patent application Ser. No. 07/865,090 filed Apr. 8, 1992 U.S. Pat. No. 05,295,180.

TECHNICAL FIELD

The present invention relates generally to positioning systems and, more particularly, to a method and system for determining the position of a mobile receiver based on the time of arrival or time difference of arrival of approximately synchronized digital range signals. The invention is particularly suited for providing customized user zones within a wireless communications service area operative in the microwave band from approximately 800 MHZ to 2.5 GHZ.

BACKGROUND ART

Figure 1:
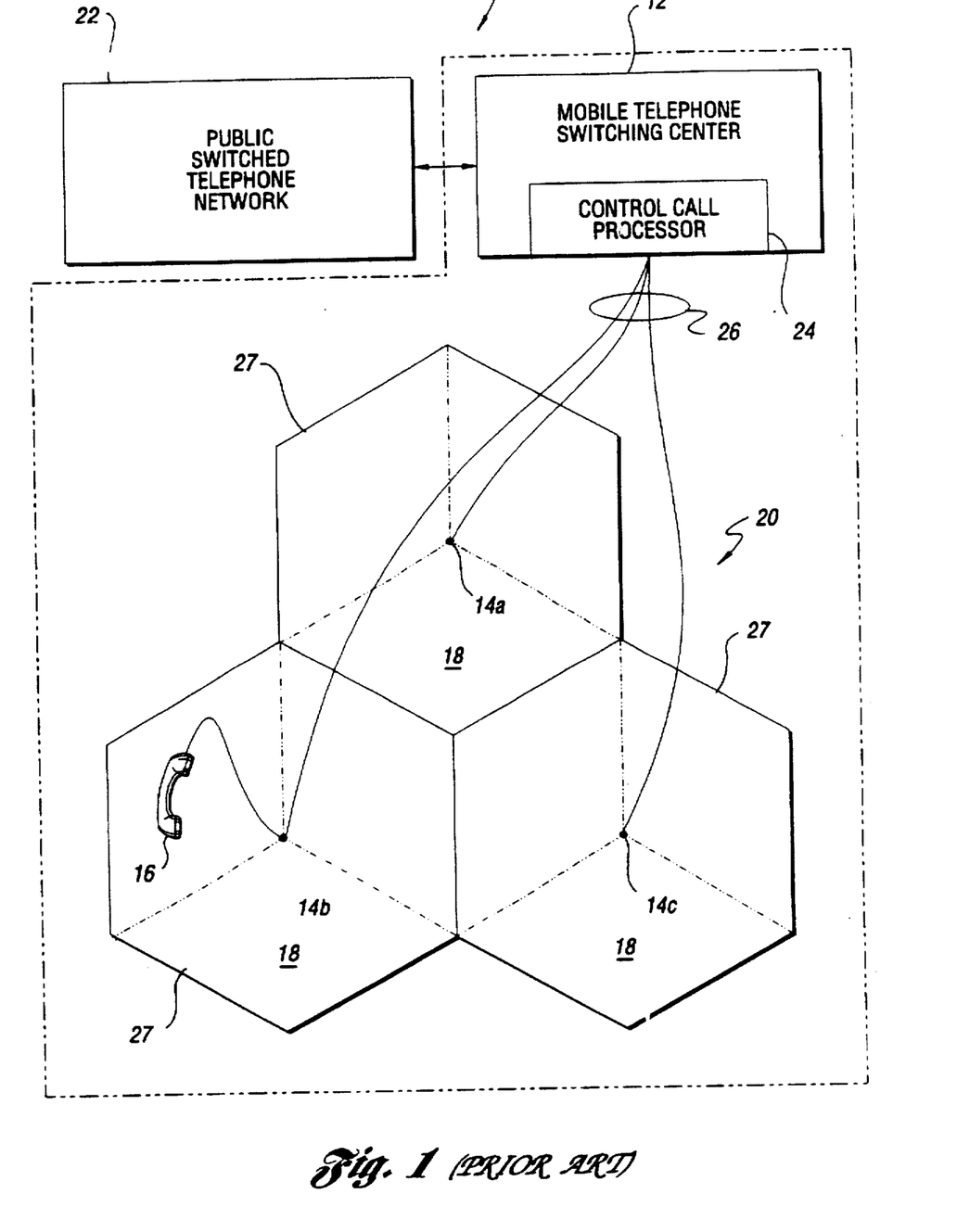
FIG. 1 is a schematic diagram of a prior art cellular telephone system.

Most metropolitan areas are now equipped with one or more forms of wireless communications networks which provide mobile telephone and other related services to customers across a broad frequency spectrum. Consider, for example, what has come to be known as "cellular" telephone services or Personal Communication Services (PCS), i.e., radio transmissions in the microwave band between approximately 800 MHZ and 2.2 GHZ. As shown in FIG. 1, prior art cellular telephone systems include a Mobile Telephone Switching Center (MSC) 12 and a plurality of cell site transceivers 14a–14c. The cell site transceivers transmit radio signals to and receive radio signals from one or more mobile units 16 that move about a cellular service area 20. A mobile unit, as the term is used herein, refers to a wireless voice telephone or data receiver that can be permanently installed at a fixed location or within a vehicle or that can be portable. Each cell site transceiver 14 is able to broadcast and receive the radio signals within a geographic area 18 called the cell site coverage area. Together, the areas 18 comprise the entire cellular service area 20. Typically, a cellular service area comprises a metropolitan area or larger region.

When a telephone call to a called mobile unit 16 originates from either another mobile unit or a land-based telephone via a Public Switched Telephone Network (PSTN) 22, a caller must first access the cellular telephone system 10. This task is accomplished by dialing the mobile unit's unique identification number (i.e., its phone number). The MSC 12 receives the call request and instructs a central call processor 24 to begin call processing. The central call processor 24 transmits a signal over a dedicated line 26 (such as a telephone line or microwave link, etc.) to each of the cell site transceivers 14a–14c causing the cell site transceivers to transmit a page signal that the mobile unit 16 receives. The page signal alerts a particular mobile unit 16 that it is being called by including as part of the page signal the paged mobile unit's identification or phone number.

Each cell site transceiver 14 transmits the page signal on one or more dedicated forward control channels that carry all pages, as well as control signals, channel assignments, and other overhead messages to each mobile unit. The forward control channel is distinct from the voice channels that actually carry voice communications between a mobile unit and another mobile unit or a land-based telephone. Each cell site transceiver may have more than one forward control channel upon which pages can be carried.

When a mobile unit is not engaged in a telephone call, it operates in an idle state. In the idle state, the mobile unit will tune to the strongest available forward control channel and monitor that channel for a page signal or other messages directed to it. Upon determining that a page signal is being transmitted, the mobile unit 16 again scans all forward control channels so as to select the cell site transceiver transmitting the strongest signal. The mobile unit then transmits an acknowledgement signal to the cell site transceiver over a reverse control channel associated with the strongest forward control channel. This acknowledgement signal serves to indicate to the MSC 12 which of the forward control channels (associated with the several cell site transceivers 14a–14c) to use for further call processing communications with mobile unit 16. This further communication typically includes a message sent to the mobile unit instructing it to tune to a particular voice channel for completion of call processing and for connection with the calling party. The details of how the cell site transceivers transmit the signals on the forward and reverse control channels are typically governed by standard protocols such as the EIA/TIA-553 specification and the air interface standards for Narrowband Analog Mobile Phone Service (NAMPS) IS-88 and IS-95 air interface standards for digital communications, all of which are well known to those of ordinary skill in the wireless telephone communications art and therefore will not be discussed.

The EIA/TIA/IS-95 "Mobile Station-Base Station Compatibility Standard for Dual-Mode Wideband Spread Spectrum Cellular System" defines a digital cellular radio common air interface. The standard makes use of Code Division Multiple Access (CDMA) technology, where both the base station and the mobile transmit a Pseudo-random Noise (PN) spreading sequence, resulting in a 1.23 MHz transmission bandwidth.

The forward link transmission from each base station consists of four types of channels: pilot, paging, synchronization (sync), and traffic. The channels are all transmitted on the same carrier frequency, using the same PN spreading code; however, the channels are distinguished through binary orthogonal codes based on Walsh functions. Each base station transmits 1 pilot channel, 1 sync channel, and multiple paging and traffic channels. Forward link signals from different base stations are distinguished through PN spreading code phase offsets. In other words, every base station uses the same PN spreading code, but the code is transmitted using different time offsets (i.e., code phases) from the master code. There are 512 allowable code phase offsets.

The CDMA reverse link from the mobile to base station are differentiated by the use of a long PN spreading code $(2^{42}-1)$, where each mobile transmits at a code phase time offset determined by a user address. Before being assigned to a reverse link traffic channel, the mobile must contact the base station using a reverse link access channel. The mobile station receiver employs multiple demodulators, which allows simultaneous demodulation of signals from up to three base stations.

While wireless communication services have been quickly embraced by those people whose business requires them to travel frequently and to be in constant communication with their clients, many individuals are discouraged from utilizing present wireless telephone systems. The main reason for this discouragement is the relatively high price charged by the service providers for a wireless telephone call. In conventional land-based telephone systems, the price of a telephone call can be tailored to reflect the supply and demand of the telephone resources available to a given area. For example, in large metropolitan areas or financial districts, users can typically expect to pay more for a telephone call than in a residential area. With current wireless technology, however, available position data is strictly limited to relatively large coverage areas and sectors thereof as defined by the RF characteristics, i.e. "footprints" of the associated transceiver. As explained below, these coverage areas are generally unsuitable for most commercial and consumer applications.

With reference again to prior art cellular telephone systems of the type shown in FIG. 1, for example, it is known by those skilled in the art that typical cell sites are divided into three "sectors" 27. Each of these sectors 27 operates as a nearly independent cell site in that it is independently controlled by the associated switch. In operation, the wireless service provider must identify user location to the coverage area of one or more of these cell sites or sectors of cell sites with the associated dependence on erratic RF propagation as a definition tool. Cell site coverage areas and sectors vary widely in size. However, they are typically on the order of several square miles in less populated rural and residential areas and decrease accordingly in more densely populated metropolitan areas. Against this background, there have been previous attempts to provide methods and systems which generally identify the positions of wireless communication system users in the above cell site coverage areas and sectors. See, for example, U.S. Pat. No. 4,876,738 issued to Selby and assigned to U.S. Philips Corporation. Selby discloses a registration procedure in which the base station monitors the location of the mobile unit by cell site. The effect is to allow enlargement of the registration area if the mobile unit consistently roams between two cells.

See also, U.S. Pat. No. 5,179,721 issued to Comroe et al and assigned to Motorola Inc. Comroe discloses a method for inter-operation of a cellular communication system and trunking communication system by transmitting an access number for each system such that the mobile unit may be used as a cellular telephone and a trunking communication device.

Finally, see U.S. Pat. No. 5,097,499 issued to Consentino and assigned to AT&T Bell Laboratories. Consentino teaches a method for preventing an overload in a reverse channel by delaying the time of the generation of timing stamps on markers.

These methods and systems, however, have proven unsuitable for commercial and consumer applications where users may, at any given time, travel through very small portions of numerous cell site coverage areas and sectors. Consider, for example, a wireless telephone customer who resides in Boulder, Colo. and who commutes to work on a daily basis to downtown Denver. The customer may typically place and receive wireless telephone calls only in the approximate 45 mile geographic area between the two cities during her commute to and from work. In fact, the customer may not even wish to be provided telephone service outside of this limited geographic area. Alternatively, she may wish to restrict telephone service outside of this area to selected hours on weekends and evenings only. This desired service area, however, most likely spans small portions of the numerous cell site coverage areas, the latter portions of which the customer has no desire of using and does not wish to be billed for. However, under current wireless technology, and as described in the prior art referenced above, presently available positioning methods and systems are limited to a determination of whether the user is within one or more predetermined cell site coverage areas or sectors. These prior art systems are incapable of providing further detail, i.e. exactly where in the cell site coverage area the user is located. The prior art systems, which might be implemented in this example to determine that the customer has passed through one or more large cell site coverage areas, does not meet the objectives of the customer and is thus not a commercially marketable product.

Prior art attempts to design higher accuracy positioning systems which utilize commercial broadcast transmissions, for example, have also met with limited success. See, for example, U.S. Pat. Nos. 4,054,880 (Dalabakis et al) and 3,889,264 (Fletcher) which disclose what are known as "Delta-Position" systems. These prior art patents describe systems using three spectrally spaced-apart radio signals, each of which is an independent AM radio signal. The systems typically have a vehicle carried mobile receiver, with a separate tuner for each station, and a second receiver at a fixed, known position. As disclosed, these systems count "zero crossings", each of which indicates that the user has moved a certain distance from his or her previous location. In operation, if a user requires knowledge of his or her current position, the user must first specify a starting position. A fixed position receiver detects frequency drift of the transmitters, which is used to adjust and coordinate the zero crossing counts made by the mobile receivers.

These systems are termed "Delta-Position" systems because they determine only the distance and direction traveled by a mobile user from any particular starting point. Neither Dalabakis nor Fletcher actually determines the position of the mobile user.

See also, U.S. Pat. No. 5,173,710 to Kelley et al which discloses the use of a fixed position receiver which is adapted to determine frequency drift along with the relative phases of various unsynchronized FM broadcast signals originating from known fixed locations. As disclosed by Kelley, each of the fixed transmitters transmits a beacon signal having a phase that is unsynchronized with the phases of the beacon signals of the other transmitters. These signals are 19 kilohertz analog pilot tones generated by commercial broadcast stereo FM stations. The fixed receiver receives the beacon signals, determines the relative phases of the beacon signals, and broadcasts data representing these relative phases for receipt by the mobile receiver which is at an unknown location. Each mobile receiver includes phase measurement circuitry that detects the phases of the beacon signals at the mobile receiver's current position on multiple distinct carrier frequencies such that the current position of the mobile unit may be determined when used in conjunction with the fixed receiver broadcast data.

None of the systems referenced above, as well as general time difference of arrival location systems such as LORAN, NAVSTAR, and GPS, as used, for example, in U.S. Pat. No. 4,833,480 issued to Palmer et al, have proven suitable for commercial applications since, by design, they require specially adapted receivers to receive and process the pilot tones, GPS signals, etc. at the mobile unit. This sophisticated end equipment, of course, significantly adds to the cost of the corresponding mobile unit. In the case of hand portable units, this additional equipment further results in a handset which is extremely bulky and difficult to handle. As a result, these systems have proven unsuitable for both large-scale commercial applications, as well as ordinary consumer use.

When applied to wireless communications of interest to the present invention, i.e., communications in the microwave band from 800 MHZ to 2.5 GHZ, these prior art systems are further considered unsuitable for commercial applications in view of their anticipated use of excessive frequency spectrum. More specifically, it is anticipated that for proper operation these systems would necessarily require transmission of signals on separate channels which would utilize an unacceptable amount of additional spectrum.

Consequently, a need has developed to provide a positioning system and method which may be practically and economically implemented for use in wireless communications systems and, in particular, in the microwave band from 800 MHZ to 2.5 GHZ. Still further, a need has developed to provide such a positioning system which may be used by wireless telephone customers to determine, in advance, customized service zones for billing and access purposes. Still further, a need has developed to provide such a positioning system and method that allows a user to determine whether she is in one of the predefined customized zones within the wireless communications service area and to convey that information to the wireless communications service system. It is further desirable that such a system and method be compatible with existing wireless telephone technology and should not degrade the operation of an existing system. Finally, such a system should neither require the allocation of more radio frequencies than are currently allocated to wireless telephone systems, nor require a substantial portion of existing wireless frequencies.

DISCLOSURE OF THE INVENTION

It is a general object of the present invention to overcome the limitations of the prior art by providing a positioning system directed for use in a wireless communications system which conserves radio spectrum by transmitting and receiving digital range signals sequentially in time using a time slotted protocol.

Yet another object of the present invention is the provision of a positioning system of the type referenced above which transmits and receives a plurality of such range signals on the same frequency so as to conserve bandwidth.

Still further, it is an object of the present invention to provide a positioning system which transmits and receives digital range signals simultaneously at known and controlled code phase offsets using a Code Division Multiple Access (CDMA) system.

Still further, it is an object of the present invention to provide a positioning system which utilizes a plurality of range transceivers at known fixed locations for periodically transmitting approximately synchronized digital range signals to a primary receiver at a known location which, through comparison to a precision time reference, provides a corresponding error signal to the range transceivers so as to more closely bring the transmitted range signals into synchronization.

Yet another object of the present invention is the provision of a method for determining the position of a mobile unit with respect to the positions of a plurality of range transceivers that are positioned at known fixed locations.

Still further, it is an object of the present invention to provide predetermined customized user zones in a wireless telephone system so as to provide customized billing and/or geographically restricted telephone access.

In carrying out these and other objects, features and advantages of the present invention, a system is provided for designing predetermined user zones within a wireless communications service area and for determining whether a mobile unit, such as, for example, a wireless telephone, Personal Digital Assistant (PDA) or similar interactive electronic device, is within a particular zone. According to the invention, the system includes a plurality of range transceivers disposed at known fixed locations. Each of the range transceivers is adapted to periodically transmit approximately synchronized digital range signals through comparison to corresponding time references. The digital range signals comprise pulse sequences such as multiple sequential "Barker Codes" or Pseudo Random Noise (PN) sequences which may be readily correlated upon receipt. In an alternate embodiment applicable to CDMA, the PN sequences are transmitted at unique code phase offsets used to identify the range transceiver.

In keeping with the invention, there is further provided one or more primary receivers disposed at known fixed locations relative to the locations of the range transceivers. The primary receivers are adapted to (a) receive the range signals, (b) determine the amount that each range signal deviates from system synchronization, and (c) provide corresponding error signals to each of the range transceivers so as to (1) bring the transmitted range signals into synchronization; (2) provide a time error message to the transmitter; or (3) for CDMA only, adjust the transmitter clock time stamp. In a preferred embodiment, the primary receivers may each further comprise a correlator or other time detection device which further detects and decodes the pulse sequences as well as a precision time reference generated locally or received from a central location having a selected accuracy sufficient for desired system tolerances. The primary receivers may further comprise a controller provided in electrical communication with the time detection device and the precision time reference for comparing the decodable sequences with the reference signal so as to determine synchronization deviation.

In further keeping with the invention, there is also provided a supplemental receiver such as, for example, a mobile telephone unit or other interactive electronic device, at an unknown location which receives at least two and preferably three of the transmitted primary range signals. Finally, there is provided computation means for computing coordinate values defining the position of the supplemental receiver. The coordinate values may be computed based on either the time difference of arrival of the received range signals or the absolute time of arrival of the received range signals.

In accordance with the invention, the plurality of range transceivers are adapted to transmit range signals sequentially in time using a time slotted protocol on the same frequency so as to conserve bandwidth. Applicants recognize, however, that in selected applications where scanning the range transceivers on the same frequency takes more time than is desirable, it may be necessary to use more than one transmission frequency. As referenced above, however, it is nonetheless still desirable that the number of frequencies utilized be minimized so as to conserve bandwidth. In operation, the range transceivers may be adapted to receive the generated error signals and correspondingly adjust the output of the next transmitted range signal so as to drive the detected synchronization error to approximately zero.

In an alternative embodiment disclosed herein, the plurality of range transceivers are adapted to transmit range signals simultaneously at a known code phase offset on the same frequency. In operation, the range transceivers may be adapted to receive the generated error signals and correspondingly adjust the output of the next transmitted range signals so as to drive the detected synchronization error to approximately zero.

Alternatively, the range transceivers may further be adapted to transmit pulse sequences which include an error portion corresponding to the approximate synchronization error of each range signal. This error portion is constantly updated in accordance with the last determined synchronization errors of the corresponding range signals received by the associated primary receiver. Alternatively, in CDMA applications, the range transmitter may transmit an adjusted time stamp message.

The disclosed positioning system may be specifically adapted for use in a wireless telephone environment wherein the determined coordinate values defining the position of the supplemental receiver or mobile unit may be compared to a stored set of primary coordinate values defining a plurality of predetermined customized user zones. Upon a determination of the location of the mobile unit relative to the boundaries of a predetermined zone, access and billing decisions may be made accordingly.

BRIEF DESCRIPTION OF THE DRAWINGS

The foregoing aspects and many of the attendant advantages of this invention will become more readily appreciated as the same becomes better understood by reference to the following best modes for carrying out the invention, when taken in conjunction with the accompanying drawings wherein like reference numerals correspond to like components and wherein.

BEST MODES FOR CARRYING OUT THE INVENTION

Figure 2:
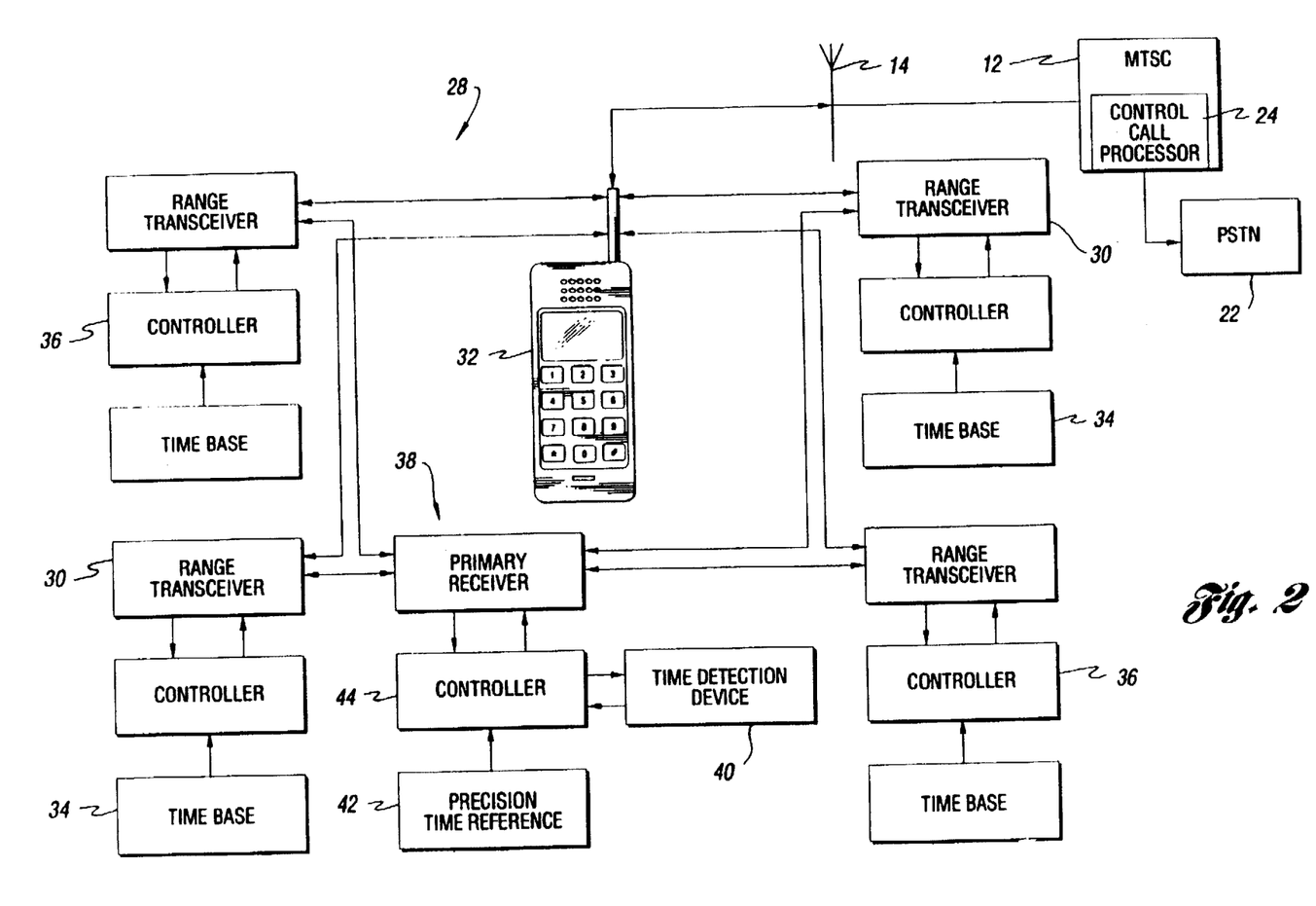
FIG. 2 is a schematic diagram of the positioning system of the present invention shown for use in a cellular telephone system.

With reference to FIG. 2 of the drawings, there is provided a schematic diagram of the generalized positioning system of the present invention shown as adapted for use in a wireless telephone system. It should be understood, however, that the method and system of the present invention may be suitable for use with most interactive electronic devices such as the above-referenced Personal Digital Assistants (PDAs) and the like. The following disclosure is thus intended as one of example and not limitation. The positioning system shown in FIG. 2 is designated generally by reference numeral 28. As shown, positioning system 28 includes a plurality of range transceivers 30 which are disposed at known fixed locations and are standard wireless communications equipment with a unique input modulation source. Range transceivers 30 transmit over a standard wireless telephone channel synchronized time pulses or pulse sequences, for ranging, together with a transmitter identification code and other necessary support data as explained in further detail below. In the preferred embodiment, these time pulses or pulse sequences are typical sequences used for ranging such as multiple sequential "Barker Codes" or Pseudo Random Noise (PN) sequences which can be decoded by a correlation detector to produce correlator output pulses which are precise in time. The length of the PN or sequential "Barker Code" group must be long enough to provide the desired time resolution. For example, 0.1 microsecond of time resolution provides approximately 100 feet resolution.

In an alternative embodiment, a correlator and a phase locked loop or phase detector can be used in conjunction with one another to provide the required time of arrival resolution on the ranging signals. In this case, as an example, the ranging sequence may be comprised of a Barker code followed by a one-zero-one-zero . . . pattern.

The correlation pulses are received by a standard wireless telephone handset or other suitable interactive electronic device 32 which has added to its circuitry a correlator (not shown) or other time detection device which detects and decodes a plurality of range signals and determines the time difference of arrival of the detected pulses. This information is, in turn, provided to the computer associated with the wireless telephone for use in calculating its position. The computer may comprise one or more chips installed directly within the mobile unit 32 such that position calculation may be made directly in the handset. In an alternative embodiment, the computer may be a part of the Mobile Telephone Servicing Center (MSC) 12 such as, for example, control call processor 24. This latter embodiment, while technically feasible for limited applications, would likely be unsuitable for large scale commercial use in view of the substantial calculation and storage capability that would necessarily be required by the control call processor 24. Moreover, to make the required position determinations for the many thousands, if not hundreds of thousands of participating users, a commercially prohibitive amount of spectrum would be required. This excessive use of spectrum resulting from transmissions between the mobile units and the control call processor 24 would most likely tie up the entire wireless communications network since an unacceptably large portion of its resources would be used for position determination.

In accordance with the invention, position calculation is accomplished through the use of time difference of arrival trilateration techniques, such as, for example, hyperbolic trilateration or time of arrival techniques, such as ranging trilateration. As readily seen, the system described herein requires very precise time synchronization since any errors in time synchronization will result in errors in the position calculation. This precision in time synchronization is achieved through the use of time bases 34 which are provided in electrical communication with each of the range transceivers 30 and corresponding controllers 36 to provide rough system synchronization. There is further provided a control loop in the timing system which consists of one or more primary receivers 38 disposed at known fixed locations relative to the locations of the range transceivers 30. In accordance with the invention, primary receivers 38 are adapted to receive the range signals generated by the range transceivers 30, determine the amount that each range signal deviates from system synchronization and provide corresponding error signals to the range transceivers so as to more closely bring the transmitted range signals into synchronization. In the preferred embodiment, the error signals may be transmitted by primary receivers 38 over a RF communication link for receipt by range transceivers 30. Primary receivers 38 thus operate as both receivers and transmitters, i.e. transceivers. However, in an alternative embodiment, primary receivers 38 may be provided in direct electrical communication with range transceivers 30 through a dedicated microwave link, fiberoptic cable, modem and wireline link, or other suitable connection.

In accordance with the invention, it is contemplated that for approximately every 100 range transceivers 30, there will be provided 10 primary receivers 38 which will observe and receive the transmitted range signals in an overlapping manner subject to well understood "line of sight" propagation restrictions. Thus, for example, in a metropolitan area the size of Seattle, Wash., which extends approximately 150 miles, primary receivers 38 will be disposed approximately every 10 miles for a total of 15 observers. Similarly, in a metropolitan area such as Salt Lake City, Utah, where there are limited line of sight restrictions, one primary receiver 38 may, in fact, be sufficient for proper operation of the system.

In the preferred embodiment, primary receivers 38 each further include a time detection device 40 operative to detect and decode the received range signals generated by primary transceivers 30 as well as a precision time reference 42 which is generated locally or received from a central source having a selected accuracy sufficient for desired system tolerances. Also, in the preferred embodiment, the primary receivers 38 each further include a controller 44 which is provided in electrical communication with the time detection device 40 and precision time reference 42 for comparing the decoded range signals with the generated reference signal so as to determine synchronization deviation.

Using known time difference of arrival techniques, the solution of the location equations, i.e. the trilateration techniques referenced above requires that the intersection of three or more hyperbolic curves of constant time delay of pulse arrival between two transmitters be determined. This is normally accomplished by transmitting from three or more paired transmitters at slightly different frequencies. Applicants recognize, however, that in limited situations where information is available to the computing means that one of two intersections of two hyperbolic curves is improbable, for example, it is far away from the real position of the mobile unit, the above calculations may be properly made with only two sets of range transceivers.

In the system disclosed herein, the use of multiple transceivers is accommodated by setting many, if not all of the transceivers 30 on the same frequency so as to conserve bandwidth and transmitting from each transceiver sequentially in time using a time slotted protocol as explained more thoroughly below. Thus, with N transceivers on the same frequency, the range signals thus consist of transceiver 1 transmitting a time pulse, then transceiver 2, then transceiver 3, .... then transceiver N, then transceiver 1, transceiver 2, ...., etc.

As referenced above, in the preferred embodiment, the primary receivers 38 and their associated components are adapted to transmit the error signals over the "receive" half of the wireless telephone channel used for the transmission of ranging signals. These error signals are received by the corresponding range transceivers 30 and used to adjust the output of the next transmitted range signal so as to drive the detected synchronization error to approximately zero. As also referenced above, alternatively, a standard telephone line or other communications technique may be used to transmit these signals. Significantly, in an alternative embodiment disclosed herein, range transceivers 30 may be adapted to transmit multiple pulse sequences as referenced above, yet which further include an error portion corresponding to the approximate synchronization error of each transmitted range signal. This error portion may be derived from the last determined synchronization error of the corresponding range signals received by the primary receiver 38.

Figure 3:
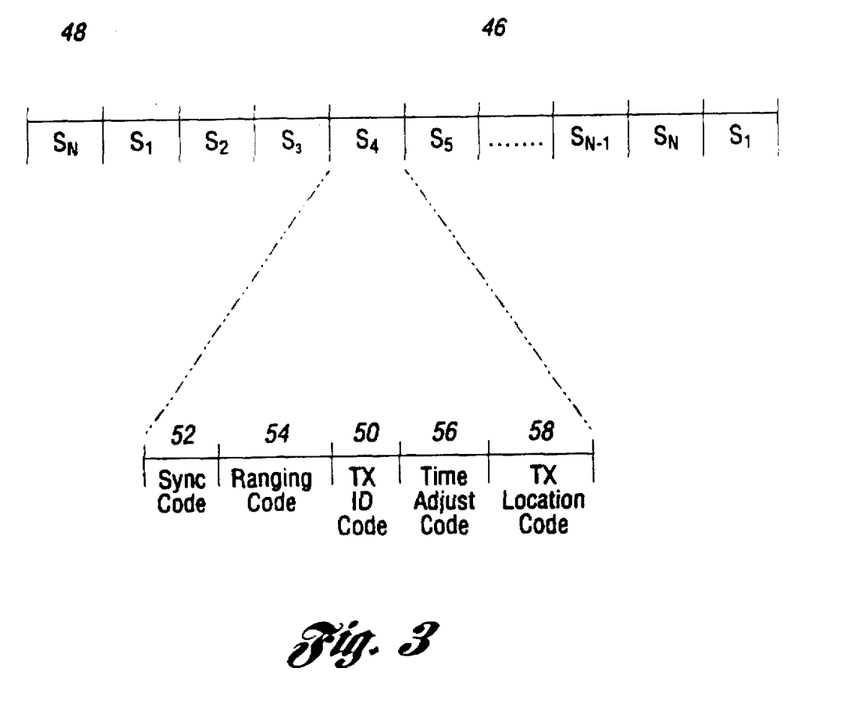
FIG. 3 is a generalized schematic timing diagram illustrating the structure of the ranging signals and other information generated by the positioning system and method of the present invention.

With reference now to FIG. 3 of the drawings, there is shown a timing diagram generally referred to by reference numeral 46 which discloses in further detail the structure of the range signals 48 and other information transmitted by the range transceivers 30. As those skilled in the art will recognize, in a wireless telephone system that includes many hundreds of mobile units, those mobile units designed to work with the present invention will periodically monitor the secondary control channel to determine its position and if they are in a predetermined zone. The range transceivers 30 sequentially transmit the range signals that are used by the handset to determine its location so that a mobile unit should have to monitor the range channel for a time not longer than the entire epoch of the time-slotted range signals 48 plus one time slot to determine its location. From this location, the mobile unit may determine if it is in a zone. The range signal 48 is divided into N time slots $S_1, S_2, S_3 \ldots S_N$.

During each time slot, for example during time slot $S_4$, several individual signals may be transmitted. The signals may include, for example, a transceiver ID 50, as referenced above, a synchronize code 52, a ranging code 54, a time adjust code 56 and a transceiver location code 58. The synchronize code 52 is a predetermined pattern of bits that allows a mobile unit to synchronize itself with the range signal being transmitted. The synchronize code may be transmitted at the beginning of each time slot by each range transceiver 30.

As shown in FIG. 3 of the drawings, the ranging code 48 consists of a series of "Barker" codes, a Pseudo Random Noise (PN) sequence, or other suitable ranging sequence of appropriate length for the required time accuracy. As the length of the code sequence is one of the determinants of ranging accuracy, the code must be carefully selected to match the system requirements.

The transmitter ID code 50 is a binary representation of the assigned number of each range transceiver 30 in the system plus appropriate error detection and correction symbols. The time adjust code 56 is a binary representation of the amount of timing error associated with a given range transceiver 30 with its ID 50. It may include error detection and correction symbols. Similarly, the transceiver location code 58 identifies the geographic location of each range transceiver 30 with its associated ID 50.

Figure 4:
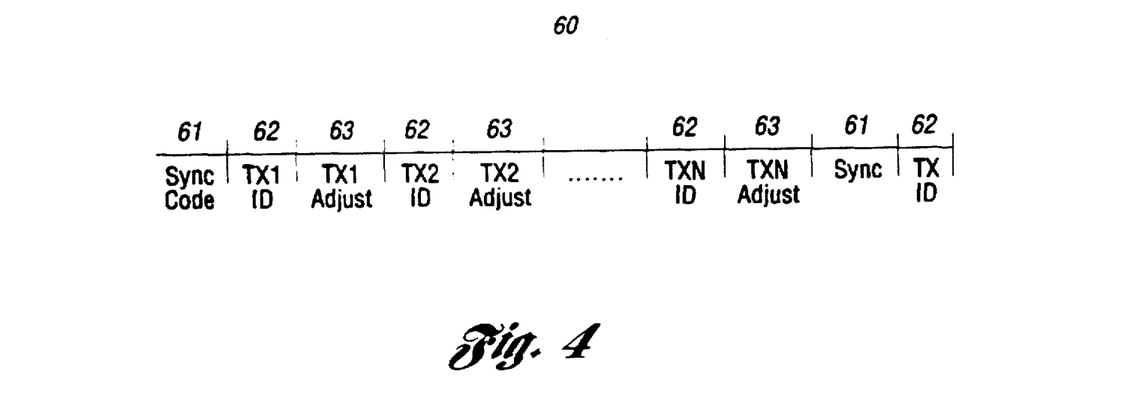
FIG. 4 is a detailed schematic timing diagram illustrating the structure of the synchronization error signals generated by the positioning system and method of the present invention as adapted for use in a wireless communications system.

As described in further detail below and as shown in FIG. 4, in operation, the primary receivers 38 send messages designated generally by reference number 60. A synchronization message 61 is sent out for use by all ranging transceivers 30 in synchronizing their receivers and detectors to the TX ID message 62 and the time adjust message 63. A designated primary receiver controller 44 generates a time adjustment message 63 for each numbered range transceiver 30. After receipt of the synchronization message 61, each range transceiver 30 looks for its ID 62 and associated time adjustment message 63. The transceiver 30 then adjusts the transmission time of its next ranging message 60 to reduce the system timing error. The transceiver 30 may also transmit the magnitude of its error for use by the mobile units 32.

Figure 8:
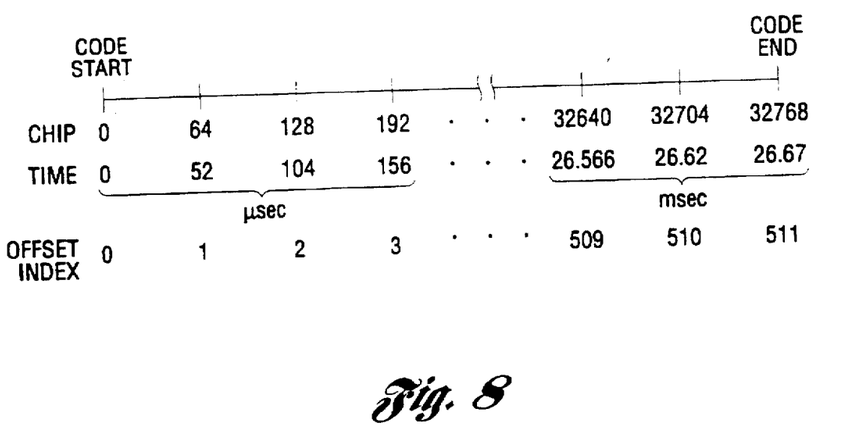
FIG. 8 is a schematic illustrating PN code phase offsets.

In an alternative embodiment, the range transceivers transmit pilot Pseudo Noise (PN) sequences, on the forward link with a unique Pilot PN code phase offset. FIG. 8 illustrates the code phase offsets. These code phase offsets are used to uniquely identify the range transceivers. These types of sequences are used in the TIA IS-95 CDMA System. The pilot PN sequence is a $2^{15}=32,768$ chip length code transmitted at a rate of 1.2288 Megachips/second. In IS-95, there are $2^9=512$ allowable pilot offset indices, which are separated by 64 chips (64 chips/offset×512 offsets=32,768 total chips).

It is possible to use the IS-95 pilot PN sequence as a ranging code to determine the location of the mobile unit 32. The pilot offsets can be used to identify arriving signals from a plurality of range transceivers 30, from which time difference of arrival or absolute time of arrival estimates can be obtained. The pilot offsets used for position location can be assigned in three ways, as will be described below. Based on the arrival time estimates and the speed of propagation, ranges, or range differences, between the range transceivers 30 and the mobile unit 32 can be calculated. The mobile unit 32 obtains the geographic locations of the range transceivers 30 by one of two possible methods; first, the location information can be transmitted over the air through the range signal; second, the locations can be stored in the mobile unit 32 in a pre-programmed look-up table. Using the range estimates and the geographic locations of the range transceivers 30, the mobile unit 32 can calculate an estimated position location by solving a system of non-linear equations.

A mobile unit 32 equipped with a position determining system scans through a group of pilot offsets, called a search group, while monitoring for received energy. The search group can be defined in one of three ways. First, the search group can consist of allowable IS-95 indices in 64 chip steps, as used for normal cellular service. Second, the search group can consist of a reserved block of allowable IS-95 indices, not assigned for normal cellular service. Third, the search can proceed through non-standard pilot offsets, which may not correspond to valid IS-95 pilot offset indices. The non-standard search group can be arbitrarily defined within the entire 32,768 chip search space, with a non-uniform interval.

Once the mobile unit 32 identifies a pilot offset with sufficient energy (i.e., above a fixed predetermined threshold level), the mobile unit 32 determines the location of the range transceiver 30 emitting the pilot offset in one of two ways. First, the mobile unit 32 may contain a pre-programmed look-up table in its computer memory for identifying the range transceiver 30 based on the known pilot offset. Alternatively, if the mobile unit 32 does not contain a preprogrammed look-up table, the mobile unit 32 will decode the Geographic Location Code on the sync channel which contains a three dimensional location of the range transceiver 30 (e.g., longitude, latitude, and elevation).

The mobile unit 32 maintains a list of pilot offsets, where the list is ranked based on a weighted combination of received signal energy and range transceiver 30 location. This step allows the mobile unit 32 to select the best candidate range transceivers 30 for determining position location. Once the number of entries in the offset list exceeds a certain threshold, the mobile unit 32 proceeds to determine the arrival time of the range transceivers 30 as described below. Otherwise, the mobile unit 32 continues scanning for pilot offsets with sufficient energy. If the mobile unit 32 does not successfully fill the offset list within a predetermined amount of time, the mobile unit 32 returns to normal functions for a second predetermined amount of time before the mobile unit 32 begins scanning pilot offsets again.

To determine the arrival time of the range transceivers 30, the mobile unit 32 performs a high resolution (10–50 nsec) time correlation on the list of ranked pilot offsets. The integration time for the high resolution correlation may be significantly longer than that used during the pilot scan period (e.g., 32,768 chips versus 128 chips).

After determining the arrival times for all of the range transceivers 30 in the ranked pilot offset list, the mobile unit 32 next calculates its position. The mobile unit 32 can process the arrival time estimates in two fundamentally different ways. First, the mobile unit 32 may difference the measurements to form time difference of arrivals (TDOA); or second, the mobile unit 32 may determine absolute time of arrival (TOA) by solving for the clock bias between the mobile unit 32 system clock and the CDMA system time. If TDOA estimates are used, then the mobile unit 32 solves a set of hyperbolic (i.e., delta-delta) equations for the position location and the unknown clock bias. If TOA estimates are used, then the mobile unit 32 solves a set of range-range (also known as rho-rho) equations for the position location. The calculation may make use of the minimum number of TOA/TDOA estimates required to solve for position. For enhanced accuracy, the mobile unit 32 may solve an overdetermined system of equations, by making use of TOA/TDOA estimates from additional range transceivers 30.

The system described herein requires very precise time synchronization since any errors in time synchronization will result in errors in the position calculation. This precision in time synchronization is achieved through the use of precision time references which are provided in electrical communication with the range transceivers 30 and their corresponding controllers 36 to provide rough system synchronization.

The IS-95 specification requires that range transceivers 30 should be synchronized to within ±three microseconds of CDMA system time and shall be synchronized to within ±10 microseconds. This translates to roughly 3,000–10,000 feet of range in error, which is unacceptable for a position location service. There are three different methods of synchronizing the CDMA system to provide sufficient accuracy for position location which are described below. All three synchronization methods use primary receiver 38 to monitor the range signals from several range transceivers 30. The primary receiver 38 determines timing correction factors (i.e., timing errors between the range transceivers 30 received signals and the master reference clock) The timing correction factor would be transferred to the range transceivers 30 through the reverse channel, wireline links, microwave links, etc. The link between the range transceivers 30 and the primary receiver 38 would use periodic or aperiodic transmission of the timing corrections.

The first method of synchronization utilizes a servo feedback loop at the primary receiver 38. After the primary receiver 38 has transferred the timing correction information to the range transceiver 30 via the time adjust message 63, the range transceiver 30 would then physically alter their transmit timing in accordance with the corrections from the primary receiver 38. This feedback loop would maintain transmission synchronization at the range transceivers 30 as required to achieve position location determination.

Figure 9:
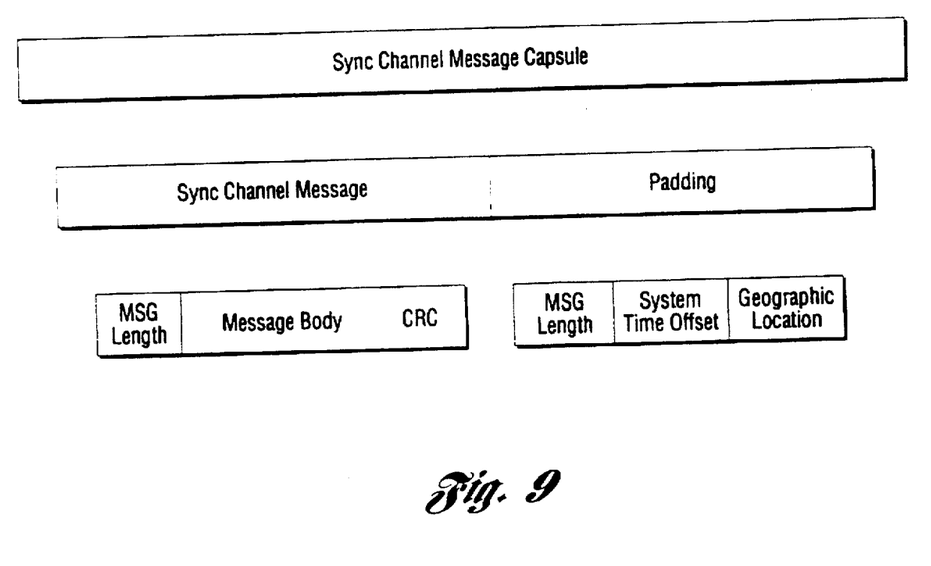
FIG. 9 is a generalized schematic illustrating the structure of the ranging signal and other information generated by the positioning system and method of an alternative embodiment of the present invention.

In the second method of synchronization, after the range transceiver receives timing correction information via the time adjust message 63, rather than physically altering transmissions, the range transceiver 30 would encode the timing correction factor for transmission over the forward link sync channel. This timing correction factor conveys the error between the range transceiver 30 transmission time and the master reference time. The correction factor would be encoded within the sync channel message capsule padding bits as illustrated in FIG. 9. Upon receiving the timing correction factor, a location equipped mobile unit 32 would correct for the timing error before processing the time of arrival (or time difference of arrival) information to calculate a position estimate. The mobile unit 32 would not necessarily be required to readjust its own clock time, but instead correct the arrival times by the appropriate offsets, before calculating position.

In the third method of synchronization, the CDMA System Time (SYS_TIME in IS-95) can be biased to correct for the base station timing error. In this method, the primary receiver 38 monitors the signals from several range transceivers 30. The primary receiver 38 would convey the timing correction factors to the range transceivers 30 via the time adjust message 63. The range transceivers 30 would then retard or advance the transmitted CDMA system times by the timing correction factors. For each pilot which the mobile unit 32 decorrelates for position location, the mobile unit 32 would decode the range signal, including the CDMA system time. The mobile unit 32 would compare the received CDMA system time with its internal clock to calculate the timing correction factor. Upon calculating the timing correction factor, a location equipped mobile unit 32 would correct for the timing error before processing the time of arrival (or time difference of arrival) information to calculate a position estimate. The mobile unit 32 would not necessarily be required to readjust its own clock time, but instead could correct the arrival times by the appropriate offsets before calculating position, thereby simulating synchronization.

In the system herein disclosed, the range transceivers 30 transmit range signals at the same frequency. Each of the range signals are sent simultaneously, but at a unique code phase offset. As a result, the signal from a close-proximity range transceiver 30 acts as interference to any distant range transceivers 30 as the mobile unit 32 approaches the close-proximity range transceiver 30. For cellular service, this scenario is acceptable because the mobile unit 32 will hand off to the range transceiver 30 that it is approaching. However, for the position location service, this is a problem. The position location user must receive information from a minimum of three range transceivers 30 (in certain situations two may be acceptable). When the mobile unit 32 gets close to a range transceiver 30, that range transceiver 30 swamps the range signals from other range transceivers 30. As a result, the signal to interference (S/I) ratios for distant range transceivers 30 become degraded. This reduction in S/I translates into a statistically larger ranging error for the distant range transceivers 30. Also, as the mobile unit 32 closely approaches a given range transceiver, the signal from the nearest range transceiver 30 saturates the receiver of the mobile unit 32, essentially preventing reception of the distant range transceivers 30. These problems can be overcome in several ways as described below.

First, the mobile unit 32 may scan the pilot offset at a longer period. The pilot PN sequence is 32,768 chips long, however, it is not necessary to correlate over the entire sequence. For example, in the normal cellular system, the integration time may be selected to match the bit duration (128 chips/bit), resulting in a 21 dB processing gain. For the position location application, one would integrate over the entire 32,768 chip sequence, resulting in a 45 dB processing gain.

Secondly, it is possible to optimize performance for the position location application by taking advantage of the auto correlation properties of the IS-95 pilot PN code. It may be possible to select pilot offsets which result in minimal interference between the main lobe and the side lobes at these offsets. In this way, the interference effects between the position location range transceivers 30 would be minimized.

One solution to the saturation problem involves the use of close proximity ranging. The saturation of the mobile unit 32 will only occur within a short distance from the range transceiver 30 antenna. If the saturation zone is within an allowable error tolerance for the position location system, then the range transceiver 30 site location can be used as the position estimate. If the saturation zone exceeds the error tolerance of the location system, then several simple methods can be used to further localize the mobile unit 32. It may be possible to obtain the mobile unit's 30 location based on ranging to the range transceiver 30. Within the accuracy of the reference clock in the mobile unit 32, it would be possible to estimate the range to the closest range transceiver 30. Further, if the range transceiver 30 is sectorized, it would be possible to localize the mobile unit 32 to within a range ban in one particular sector.

Saturation may also be overcome by increasing the dynamic range of the mobile unit 32. By changing the design parameters for the mobile unit 32 front end, it may be possible to increase the dynamic range beyond the 80 dB requirement that is specified in IS-98.

And finally, by employing directional antennas at the range transceivers 30, it may be possible to simultaneously avoid saturation and to improve the signal to interference ratios of distant range transceivers 30. The general concept is to allow distant range transceivers 30 to be received during a gated scanning period. There are two basic approaches: first, to create a rotating null beam (i.e., a narrow angular area with reduced signal level) at each range transceiver 30; and second, to create a narrow fan-beam from the cell site which continually rotates. These methods apply primarily to phased array antennas with steerable beams, however, they may also be applicable to sectorized systems.

In the null beam approach, the basic principle is to turn off the beam from the range transceivers 30 over a small angular extent, where the null beam rotates at a constant angular rate. In reality, it will not be possible to completely remove the signal from the close proximity site due to antenna side lobes and back lobes, however, it might be possible to achieve approximately 20 dB relative reduction. While the mobile unit 32 is in the null created by the close proximity range transceiver 30, the mobile unit 32 must acquire pilots from the distant range transceivers 30. The null beams must be synchronized so that the mobile unit 32 is not simultaneously nulled by the close proximity range transceiver 30 and the distant range transceiver 30. The rotating null beams may have to have different rotation rates at each of the range transceivers 30 to avoid persistent blind spots.

The alternative method to the null beam approach involves creating a rotating fan-beam at each range transceiver 30. During the period when the mobile unit 32 is not covered by the fan-beam, it must acquire pilots from the distant range transceivers 30.

Operation

Figure 5A:
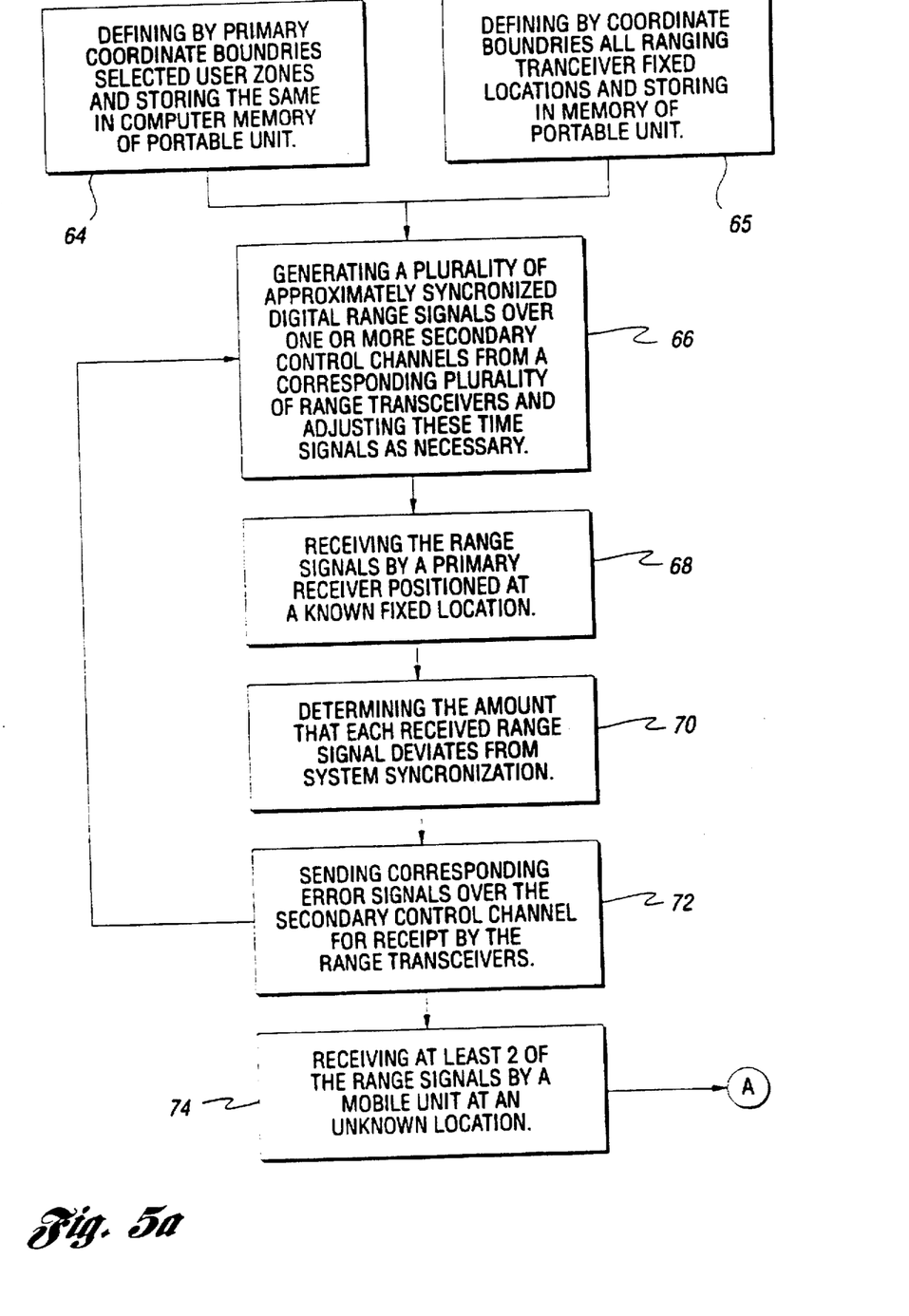
FIGS. 5a and 5b are block diagrams illustrating the operation of the system and method of the present invention.
Figure 5B:
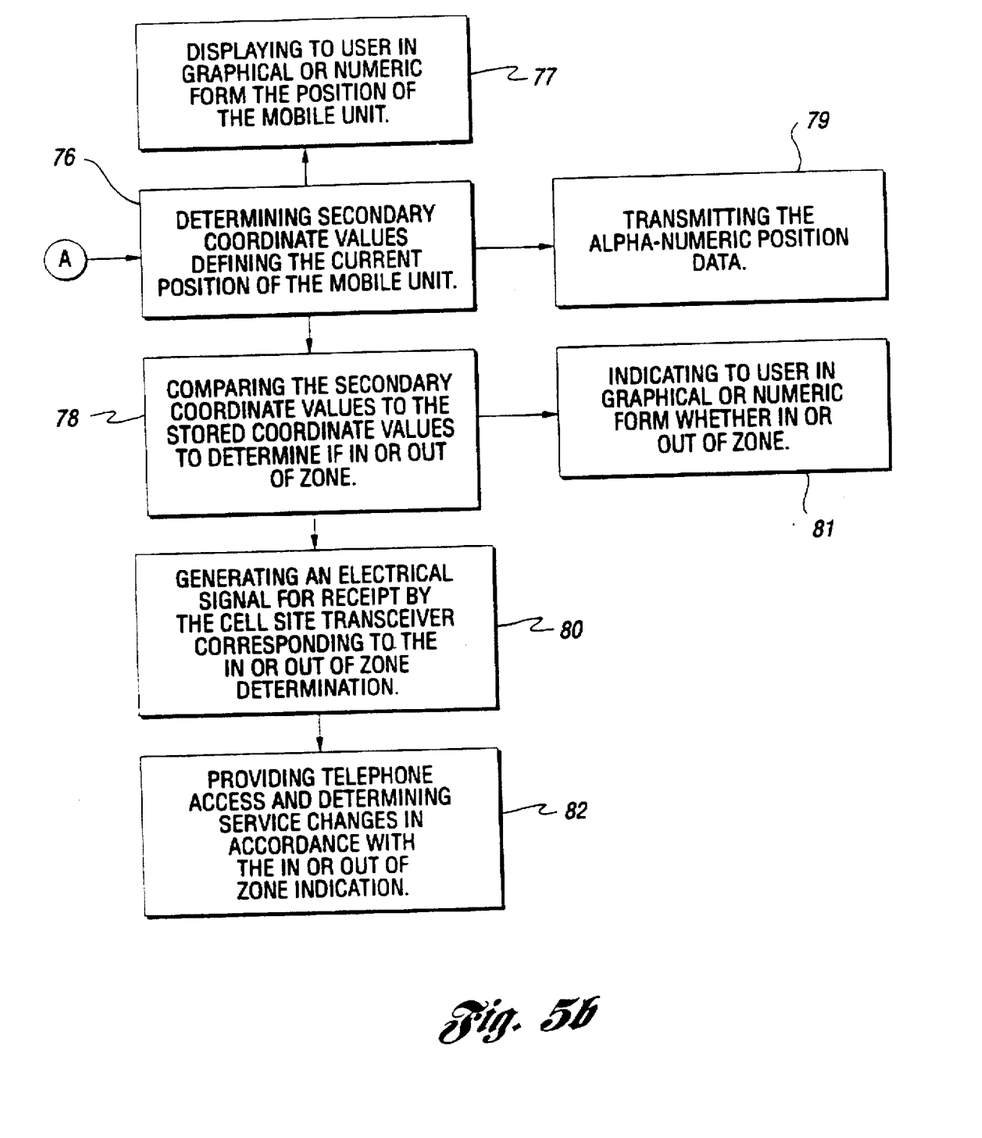

With reference now to FIGS. 5a and 5b of the drawings, the method of operation of the positioning system of the present invention will now be described in further detail with reference to wireless telephone applications. More specifically, the method of providing customized user zones within a wireless telephone system will be described.

As referenced in FIG. 1 above, conventional cellular telephone networks include a Mobile Telephone Switching Center (MSC) which further includes a computer having memory such as a control call processor 24 which is further provided in electrical communication with a cell site transceiver 14. Cell site transceiver 14 transmits and receives voice signals and control signals to and from mobile telephone units 16 over one or more respective voice and primary control channels in order to provide wireless telephone service within a given cell site coverage area.

In keeping with the invention, customized user zones are provided by defining: (1) primary coordinate boundaries of one or more user zones; and (2) coordinate boundaries of all ranging transceiver fixed locations and storing these coordinate boundaries in computer memory associated with the mobile unit as shown in blocks 64 and 65. As referenced above, in one preferred embodiment, this computer memory is disposed within the handset 32. Alternatively, the location of the range transceivers 30 is encoded in the range signal. However, for limited applications, the computer and associated memory may be located in a remote location, such as, for example, in the control call processor 24 of MSC 12. With reference to FIG. 2, at a plurality of known fixed locations, approximately synchronized digital range signals are generated over one or more secondary control channels from a corresponding plurality of range transceivers 30. These time signals are, in accordance with the invention, adjusted as necessary as shown in block 66. Thereafter, as shown in blocks 68, 70 and 72, at a known location relative to the locations of the range transceivers, the range signals are received by one or more primary receivers which are adapted to (a) determine the amount that each range signal deviates from system synchronization and (b) send corresponding error signals over the secondary control channels for receipt by the range transceivers so as to more closely bring the transmitted range signals into synchronization.

By receiving these range signals (preferably 3 or more, unless improbable information is known) by the mobile unit over secondary control channels, a determination of the secondary coordinate values defining the present position of the mobile unit as shown in blocks 74 and 76 may be made based on the time difference of arrival, or the absolute time of arrival, of the received range signals. Thereafter, as shown in block 78, by comparing these determined secondary coordinate values to the stored primary coordinate values, a determination may further be made of the current position of the mobile receiver as well as whether the mobile unit is within one of the predetermined or "customized" user zones. Thereafter, an electrical signal may be generated by the mobile unit over the primary control channel for receipt by the cell site transceiver which corresponds to the determined mobile unit position, i.e., whether the mobile unit is "in" or "out" of one or more zones which may be customized for the user or specifically selected from a plurality of predetermined zones. Based upon this information, telephone service charges and, perhaps even telephone access, may be provided and determined in accordance with the in or out of zone indication (see blocks 80 and 82). An indication may also be numerically or graphically provided to the user of whether she is in or out of one or more zones such as, for example, through the use of light-emitting diodes (LEDs) as shown in block 81.

It is also possible to display the position information visually in either graphical or numerical form as shown in block 77. This information could be displayed against the background of a city map that had been previously stored in the mobile unit's memory or displayed in other appropriate graphical form, such as a Personal Digital Assistant (PDA) or other suitable interactive electronic device. The location could also be displayed in numeric (or street name) form for use by the mobile subscriber.

The position information may also be transmitted in numeric form over a normal wireless channel as shown in block 79. This allows the mobile user to identify her location to other services such as emergency (911) operators or other similar providers.

Figure 6:
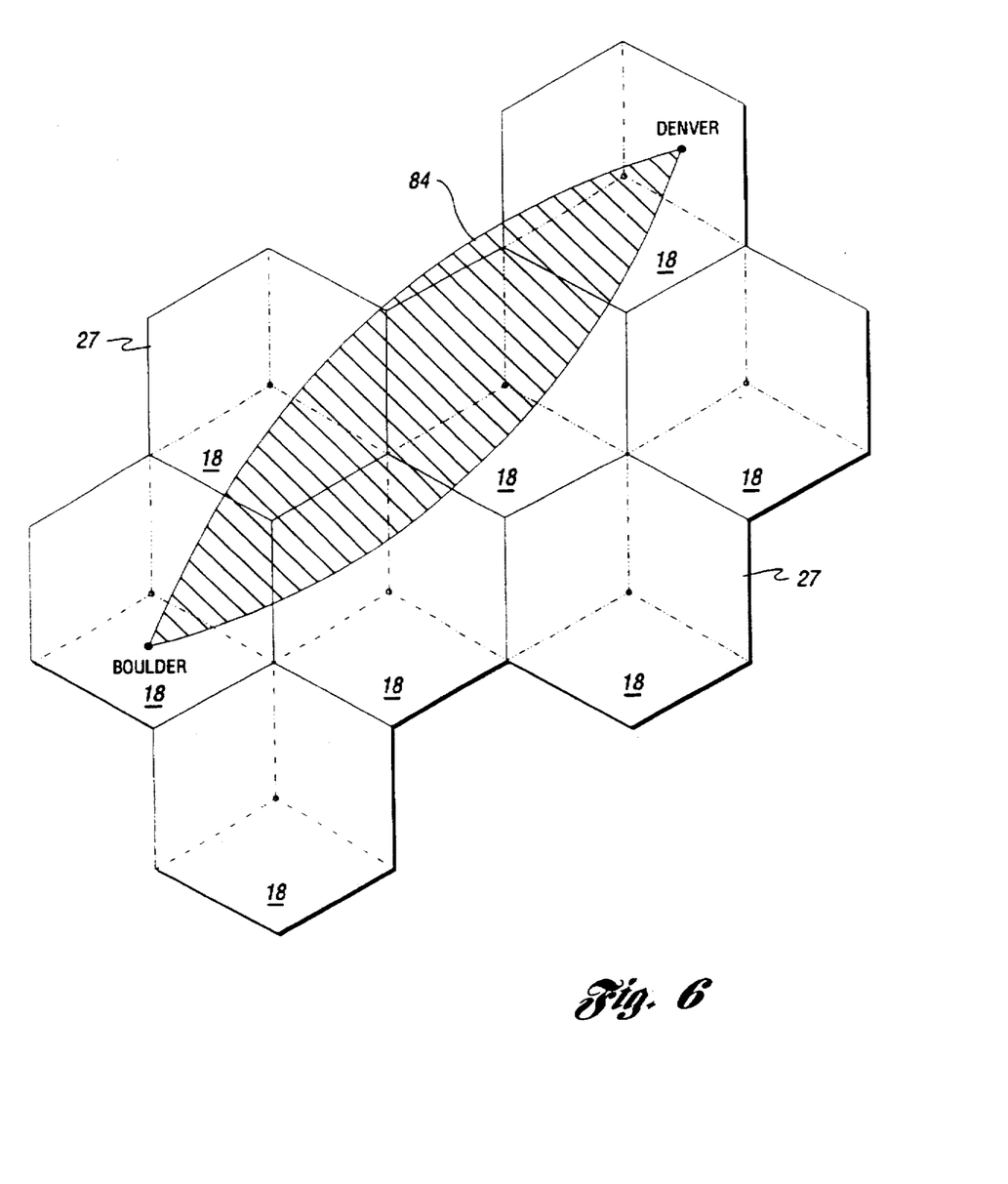
FIG. 6 is a schematic diagram illustrating the customized zone ($Z_c$) which may be defined by the system and method of the present invention.

Significantly, the major difference between the wireless telephone system 28 and the wireless telephone systems of the prior art (shown in FIG. 1) is the division of the wireless service area 20 into any number of customized zones $Z_1$, $Z_2$, $Z_3$, . . . $Z_N$. These zones may be located in separate geographic areas or may overlap partially or completely. The zones are not associated with a cell site coverage area 20. Rather, they may be predefined by the telephone service provider or, in the alternative, specifically defined or "customized" for the individual user as referenced above. Thus, for example, a customized zone $Z_c$ as shown in FIG. 6 and designated by reference numeral 84, may comprise a variety of lengths, widths and shapes and may overlap one or more cell site coverage areas 20, as well as individual cells 18 and sectors 27.

The wireless telephone system 28 according to the present invention allows the user of a mobile unit 30 to contract with the wireless communications service provider that operates the wireless telephone system in order to select or define one of a plurality of zones as a "primary" zone. Each time the mobile unit 30 makes or receives a telephone call within the primary zone, the user is billed according to a rate schedule set for that particular zone. For example, and as shown in FIG. 2, assuming the user of mobile unit 30 has elected or defined zone $Z_1$ as the primary zone, then each time the mobile unit 30 places or receives a telephone call, a determination is made whether the unit is within the boundaries of zone $Z_1$. This determination is made with reference to a set of stored coordinate values which correspond to predetermined user zones. If the mobile unit is within zone $Z_1$, an indication is provided to the user so that she knows that the mobile unit is in the primary zone. This indication may be made through the use of one or more light-emitting diodes or other appropriate interface on the mobile telephone handset.

If, while in the primary zone, the user initiates or receives a telephone call, a signal is transmitted to the associated MSC and the user is billed for the call at a rate set for that particular zone. For example, the wireless communications service provided may wish to give a user a discount made within zone $Z_1$ and charge a premium for calls made outside the zone $Z_1$. Conversely, if zone $Z_1$ is located in a high density area. The user may be charged a premium rate for making or receiving calls within the zone.

Figure 7:
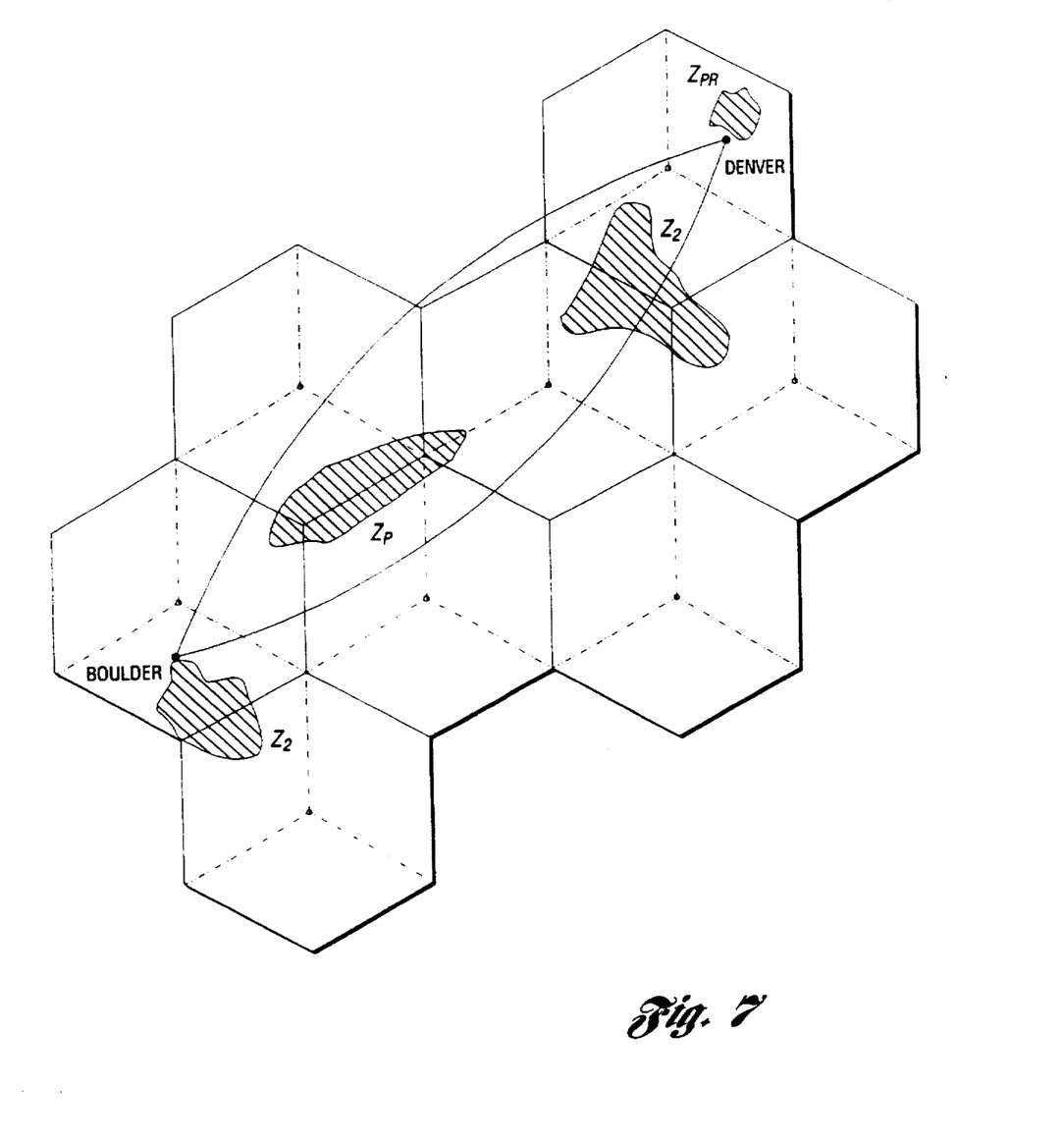
FIG. 7 is a schematic diagram illustrating the many types of user zones, i.e., primary, secondary, public and private, which may be defined and utilized in accordance with the teachings of the system and method of the present invention.

The wireless telephone system according to the present invention also allows a user to select or define one or more "secondary" zones $Z_2$. In addition to checking to see if the mobile unit is within its primary zone, the mobile unit checks to see if it is within one of its secondary zones. If, for example, the unit is within a secondary zone at the time of call initiation, a signal is transmitted to the associated MSC and the user is billed at a "secondary" zone rate. Additionally, the wireless communications service area may contain several "public" zones $Z_p$ in such areas as airports or shopping malls or predefined private zones $Z_{PR}$, such as, for example, within the confines of a research facility.

In accordance with the present invention, it may thus be determined if the mobile units are located in corresponding public or private zones and, if so, the user will be billed for calls made in the associated zone at the corresponding zone rate. As referenced above, the user may similarly be restricted access to selected zones at selected times in accordance with predetermined rules made known to or defined by the user. In any event, one purpose of the wireless telephone system 28 according to the present invention is to be able to provide an indication to the user of the mobile unit 30, and the associated MSC whether the user is inside or outside the boundaries of a particular zone - - - subject to the limitations of ranging accuracies.

The capability for determining its location by a mobile user also makes it possible for the wireless communications service provider to offer other services such as location of user position on a city map, various emergency services that are dependent on location, and other position dependent services, such as those which might be utilized, for example, by a Personal Digital Assistant (PDA) or other interactive electronic device.

While the best modes for carrying out the invention have been described in detail, those familiar with the art to which this invention relates will recognize various alternative designs and embodiments for practicing the invention as defined by the following claims.

What is claimed is:

1. For use in a wireless telephone system that includes a computer having memory provided in electrical communication with a cell site transceiver that transmits and receives voice signals and control signals to and from a mobile telephone unit over one or more respective voice and primary control channels in order to provide wireless telephone service within a cell site coverage area, a method of providing predefined user zones for access restriction and billing purposes, comprising:

defining (1) by primary coordinate boundaries a user zone; and (2) a plurality of ranging transceiver fixed locations and storing said coordinates and corresponding user zone in said computer memory;

at said plurality of ranging transceiver fixed locations, generating approximately synchronized digital range signals over one or more secondary control channels;

at a known location relative to the locations of said range transceivers, receiving said range signals by a primary receiver, determining the amount that each range signal deviates from system synchronization, and sending corresponding error signals over said secondary control channels to said range transceivers so as to more closely bring said transmitted range signals into synchronization;

receiving said range signals by said mobile unit over said secondary control channels;

determining the difference of arrival times of said received range signals in said mobile unit;

determining secondary coordinate values, from said difference of arrival times of the received range signals, defining the position of said mobile unit relative to said predetermined zone;

transmitting an electrical signal over said primary control channel for receipt by said cell site transceiver indicating whether said mobile unit is in or out of said predetermined zone; and determining telephone service charges and/or access based on said determined mobile unit position and predetermined tariff and access tables.

2. The method of claim 1 further comprising adjusting a time stamp of the next transmitted range signal of each of said range transceivers in accordance with said determined synchronization error so as to simulate synchronization.

3. The method of claim 2 further comprising the step of adjusting the time stamp of the next range signal generated by each of said range transceivers in accordance with the last determined synchronization error of the corresponding range signals received by said primary receiver.

4. The method of claim 1 further comprising adjusting the output of the next transmitted range signal of each of said range transceivers in accordance with said determined synchronization error so as to drive said corresponding synchronization error to approximately zero.

5. The method of claim 1 wherein said range transceivers are each adapted to transmit multiple pulse sequences, said pulse sequences including an error portion corresponding to the approximate synchronization error of each range signals.

6. The method of claim 5 further comprising the step of adjusting the error portion of the next range signal generated by each of said range transceivers in accordance with the last determined synchronization error of the corresponding range signals received by said primary receiver.

7. The method of claim 1 wherein said plurality of ranging transceiver fixed locations are stored in said computer memory.

8. The method of claim 1 wherein said plurality of ranging transceiver fixed locations are encoded in said digital range signals.

9. For use in a wireless telephone system that includes a computer having memory provided in electrical communication with a cell site transceiver that transmits and receives voice signals and control signals to and from a mobile telephone unit over one or more respective voice and primary control channels in order to provide wireless telephone service within a cell site coverage area, a method of providing predefined user zones for access restriction and billing purposes, comprising:

defining (1) by primary coordinate boundaries a user zone; and (2) a plurality of ranging transceiver fixed locations and storing said coordinates and corresponding user zone in said computer memory;

at said plurality of ranging transceiver fixed locations, generating approximately synchronized digital range signals over one or more secondary control channels;

at a known location relative to the locations of said range transceivers, receiving said range signals by a primary receiver, determining the amount that each range signal deviates from system synchronization, and sending corresponding error signals over said secondary control channels to said range transceivers so as to more closely bring said transmitted range signals into synchronization;

receiving said range signals by said mobile unit over said secondary control channels;

determining the absolute time of arrival of said received range signals, in said mobile unit determining secondary coordinate values, from said absolute time of arival of the received range signals, defining the position of said mobile unit relative to said predetermined zone;

transmitting an electrical signal over said primary control channel for receipt by said cell site transceiver indicating whether said mobile unit is in or out of said predetermined zone; and determining telephone service charges and/or access based on said determined mobile unit position and predetermined tariff and access tables.

10. The method of claim 9 further comprising adjusting a time stamp of the next transmitted range signal of each of said range transceivers in accordance with said determined synchronization error so as to simulate synchronization.

11. The method of claim 10 further comprising the step of adjusting the time stamp of the next range signal generated by each of said range transceivers in accordance with the last determined synchronization error of the corresponding range signals received by said primary receiver.

12. The method of claim 9 further comprising adjusting the output of the next transmitted range signal of each of said range transceivers in accordance with said determined synchronization error so as to drive said corresponding synchronization error to approximately zero.

13. The method of claim 9 wherein said range transceivers are each adapted to transmit multiple pulse sequences, said pulse sequences including an error portion corresponding to the approximate synchronization error of each range signals.

14. The method of claim 13 further comprising the step of adjusting the error portion of the next range signal generated by each of said range transceivers in accordance with the last determined synchronization error of the corresponding range signals received by said primary receiver.

15. The method of claim 9 wherein said plurality of ranging transceiver fixed locations are stored in said computer memory.

16. The method of claim 9 wherein said plurality of ranging transceiver fixed locations are encoded in said digital range signals.

* * * * *